United States Patent
Rossignac et al.

Patent Number: 5,359,704
Date of Patent: Oct. 25, 1994

[54] METHOD FOR SELECTING SILHOUETTE AND VISIBLE EDGES IN WIRE FRAME IMAGES IN A COMPUTER GRAPHICS DISPLAY SYSTEM

[75] Inventors: Jaroslaw R. Rossignac; Maarten J. van Emmerick, both of Ossining, N.Y.

[73] Assignee: International Business Machines Corporation, Armonk, N.Y.

[21] Appl. No.: 785,383

[22] Filed: Oct. 30, 1991

[51] Int. Cl.$^5$ .............................................. G06F 15/72
[52] U.S. Cl. ..................................... 395/122; 395/135
[58] Field of Search ............... 395/121, 122, 127, 135, 395/138, 123

[56] References Cited

U.S. PATENT DOCUMENTS

| | | | |
|---|---|---|---|
| 4,646,355 | 2/1987 | Petrick et al. | 382/54 |
| 4,685,070 | 8/1987 | Flinchbaugh | 395/124 |
| 4,847,789 | 7/1989 | Kelly et al. | 395/121 |
| 4,855,938 | 8/1989 | Gonzalez-Lopez et al. | 395/122 |
| 4,912,659 | 3/1990 | Liang | 395/134 |
| 4,984,157 | 1/1991 | Cline et al. | 395/124 X |
| 5,043,921 | 8/1991 | Gonzalez-Lopez et al. | 395/122 |
| 5,159,663 | 10/1992 | Wake | 395/122 |
| 5,220,646 | 6/1993 | Fossum | 395/122 |
| 5,245,700 | 9/1993 | Fossum | 395/122 |

OTHER PUBLICATIONS

Foley, van Dam, Feiner and Hughes, "Computer Graphics Principles and Practice", Second Edition, Addison-Wesley Publishing Company, at 665-672 (1990).

Saito and Takahashi, "Comprehensible Rendering of 3-D Shapes", Computer Graphics 24(4) (Proceedings Siggraph '90) at 197-206.

Srinivasan, Liang, and Hackwood, "Computational Geometric Methods in Volumetric Intersection for 3D Reconstruction", 1989 IEEE International Conference on Robotics and Automation, Cat. No. 89CH2750-8 at 190-195 (May 1989).

*Primary Examiner*—Mark K. Zimmerman
*Attorney, Agent, or Firm*—Heslin & Rothenberg

[57] ABSTRACT

A first method for producing wire-frame images of tessellated objects in real time utilizing existing hardware capabilities removes hidden lines by displaying the frame slightly away from the actual edges and toward the viewing direction to ensure the portion of the frame intended to be visible is not obscured by the visible faces and that the hidden portion of the frame is obscured by the visible faces. A second method allows for visible and hidden lines to be shown in unique line styles. This is done by first displaying all lines in the hidden line style while suppressing the faces. Then, the first method is performed and the lines that are visible lines are overwritten in another line style. A third method shows only visible silhouette and intersection edges. The visible silhouette edges are obtained by displaying the frame in thick lines behind the visible faces. Then, intersection edges are displayed in front of the faces so that only visible ones can be seen. A fourth method builds on the third by also showing hidden silhouette and intersection edges in a unique line style. Each object's silhouette edges are first obtained in hidden line style as if alone. Then, on all objects taken as one, all intersection edges are displayed and the third technique is performed in visible line style. The methods provide real time performance and can be implemented using standard graphics hardware. In addition, no edge-face adjacency information of objects is needed.

22 Claims, 13 Drawing Sheets

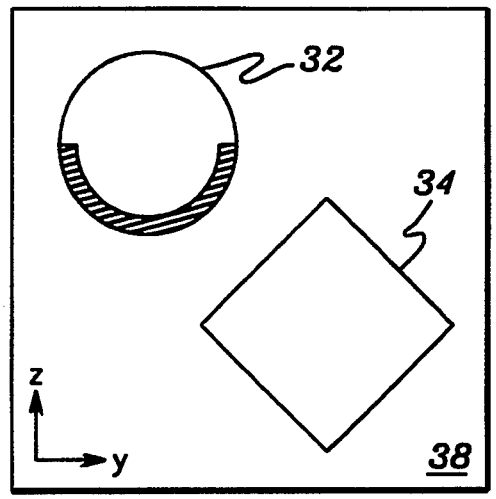
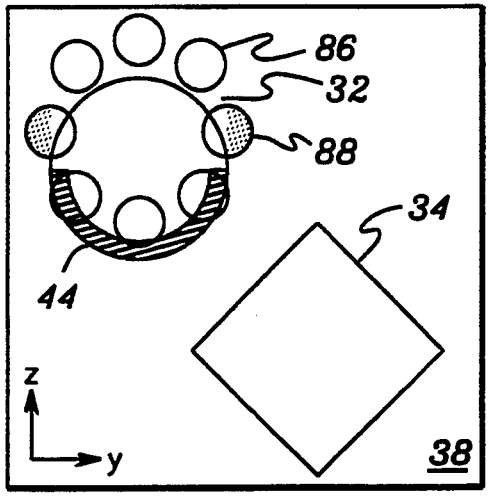
fig. 9a          fig. 9b
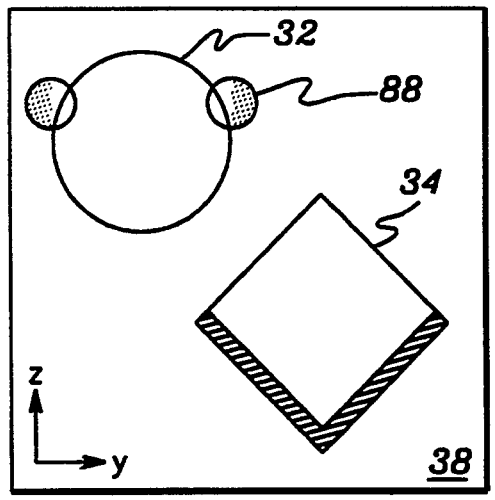
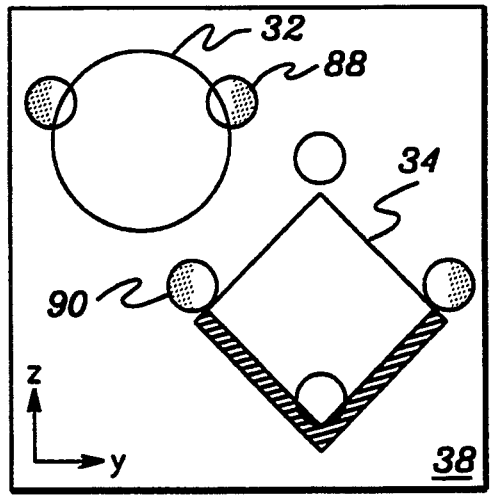
fig. 9c          fig. 9d

METHOD FOR SELECTING SILHOUETTE AND VISIBLE EDGES IN WIRE FRAME IMAGES IN A COMPUTER GRAPHICS DISPLAY SYSTEM

BACKGROUND OF THE INVENTION

1. Technical Field

The present invention relates to computer graphics generation and display, and more particularly to a hardware assisted method for rendering wire-frame images of tessellated objects with hidden lines either removed or displayed in a different line style than visible lines, and with tessellation edges that are not silhouette edges suppressed.

2. Background Art

Computer graphics display systems typically derive images from stored digital data representative of points in a three-dimensional coordinate system. The points correspond to the vertices of polygons, which, in turn, form the "building blocks" of larger objects which are the ultimate display objects. The vertex data stored in the system's memory includes positional data in a three-dimensional coordinate system in which, for example, the X and Y axes define a view plane and the Z axis represents distances from a viewpoint. In the generation of an actual graphics display, the polygons defining the object to be displayed are projected onto the view plane.

A typical graphics display system's hardware includes a geometric model processor which processes digital data representing coordinates of vertices of the object or objects to be displayed to produce digital data representing a tessellated version of the object or objects, a rasterizer which transforms three-dimensional digital data into two-dimensional digital data and scan-converts the two-dimensional data to produce a depth value for each pixel covered by the object and a color value corresponding to that depth value, a depth buffer in which is stored depth values relating to an object to be displayed, a frame buffer in which pixel color values are stored, and a display screen on which the image is displayed.

Among the types of images which can be produced by a typical graphics display system is a wire-frame image. A wire-frame image consists of line segments on the display screen representing the object, as distinguished from other representations, such as a shaded image. To help clarify a wire-frame representation, curved portions are usually tessellated. Tessellation is the piecewise planar approximation of a curved face by a connected mesh of polygons (or facets). While a tessellated wire-frame image is useful in visualizing objects for a variety of purposes, for example, design, there exists limitations in its current usefulness. The user may wish to remove hidden lines, i.e. lines which could not be seen from a given viewing direction if the object were a solid, or lines obscured by other objects. The user may want to distinguish between visible and hidden lines; visible lines being those which could be seen from a given viewing direction if the object were a solid. The user may also want to treat different categories of lines differently, for example silhouette and intersection edges.

The broad category of tessellation edges encompasses both silhouette and intersection edges. Silhouette edges are those edges whose projection lies on the boundary of the two-dimensional projection of the object onto a view plane from a given viewing direction. Intersection edges are those edges which lie on the boundary between any two adjacent faces of the object. A face is defined as any continuous portion of the object boundary that lies on a single surface. For example, a cube has six faces, and a cylinder has three. Visible edges may be obscured by the faces they lie on due to round-off errors in the scanconversion process. In addition, the foregoing needs must be addressed in real time to be most useful.

Prior art techniques exist which address the problem of hidden line and surface removal. For example, a depth buffer technique is often used in which the depth values for each projected point are determined and compared. For any given display point on the view plane (corresponding to a particular pixel on the view screen) having a corresponding storage location in the depth buffer and the frame buffer of the system, the point chosen for display will be that which is closest to the viewpoint. Thus, for example, in the generation of a shaded image of an object, the points of the polygons closest to the viewpoint will be displayed while those hidden by closer polygons will not. This prior art technique is generally described by Foley, Van Dam, Feiner and Hughes, "Computer Graphics Principles and Practice," second edition, Addison-Wesley Publishing Company, Inc., at 665–72 (1990). These techniques are not directly applicable to the problem of real time hidden line removal in wire-frame displays.

U.S. Pat. No. 4,855,938, "Hidden Line Removal Method With Modified Depth Buffer" issued to Gonzalez-Lopez et al. discloses a method for hidden line removal wherein objects are tessellated into triangles. However, that method requires that each triangle be processed one at a time, and does not address the need to distinguish silhouette edges from other tessellation edges. In addition, that method requires specialized hardware to implement. U.S. Pat. No. 5,043,921, "High Speed Z-Buffer Control" issued to Gonzalez-Lopez et al. discloses a method for removing hidden surfaces which saves pixel values only for those surfaces closest to a given viewpoint. While the present invention utilizes this concept, Gonzalez-Lopez et al. require specialized hardware not necessary in the present invention. Other prior art techniques to remove hidden lines include software solutions which are generally too slow to obtain real-time display. Integration of a software solution into the pipeline architecture typically used in graphics display systems is restricted, since most software solutions rely on face-to-edge adjacency information typically not available in the pipeline.

The problem of distinguishing silhouette edges has recently been addressed by Saito and Takahashi in "Comprehensible Rendering of 3-D Shapes," Computer Graphics 24(4) (Proceedings Siggraph '90) at 197–206. They introduce a two-dimensional image processing technique which highlights shape features and silhouette edges, but does not provide for clarification of the internal structure of a model.

The problem of visible edges being obscured by the faces they lie on was also addressed in U.S. Pat. No. 4,855,938. There, a special value is used to mark pixels where visible edges are to be displayed. While this technique does solve the problem, it requires two passes over each polygon edge and is thus relatively slow for modern graphics needs. Also, it does not address the need to distinguish silhouette edges from other tessellation edges.

SUMMARY OF THE INVENTION

The invention described herein satisfies the above-identified needs and overcomes the limitations of the prior art. The present invention provides a method for distinguishing between visible and hidden lines by employing a depth value comparison test and a move forward transformation. The invention also encompasses a method for distinguishing silhouette edges from other tessellation edges by using a depth value comparison test, a move backward transformation, and a different line thickness. The invention provides techniques for producing wire-frame images of tessellated objects in real time, utilizing existing hardware capabilities, and with the ability to eliminate hidden lines, show hidden lines in a unique line style, and to ignore tessellation edges that are not silhouette edges.

Accordingly, it is an object of this invention to provide a new technique for hidden line removal in wire-frame graphic displays in real time utilizing existing hardware capabilities. It is another object of this invention to provide a new technique for displaying hidden and visible lines in different line styles in wire-frame graphics displays in real time utilizing existing hardware capabilities. It is a further object of this invention to provide a new technique for displaying silhouette and intersection edges, either visible edges alone, or both visible and hidden edges in different line styles, in wire-frame graphics displays in real time utilizing existing hardware capabilities.

Briefly described, the method of this invention involves techniques to produce a wire-frame image of a tessellated object in real time with particular qualities; namely, hidden lines removed, hidden lines shown in a different line style than visible lines, visible silhouette and intersection edges shown, and visible silhouette and intersection edges shown in a different line style than hidden silhouette and intersection edges, utilizing existing hardware capabilities.

A first aspect of the present invention involves the generation of a wire-frame image with hidden lines removed. In this technique, the frame buffer is initially masked to prevent color value storage during scanconversion and hence to prevent display. The faces of the object are scanconverted to obtain a depth value for each pixel covered by a projection of the object onto a view plane. During scanconversion, a depth value comparison test is done which decides if the depth value currently computed in the scanconversion process is larger or smaller than that previously stored in the depth buffer at the location corresponding to a given pixel. If the computed depth value is smaller, it replaces the previously stored depth value. When the scanconversion process is complete, the frame buffer is unmasked and the frame buffer is updated with color values for the tessellation edges of the object at a distance in front of the visible faces of the object in relation to a chosen viewpoint. The pixels of the display screen then display according to the frame buffer color values producing an image in which the visible faces do not obscure the visible tessellation edges, and the hidden tessellation edges are obscured by the visible faces. The distance is preferably determined dynamically by an epsilon-based transformation resulting in a change in depth translation coordinates in a viewing matrix.

A second aspect of the invention involves the generation of a wire-frame image with visible and hidden lines shown in different line styles. In this second technique, the depth value comparison test is initially turned off so that all lines, both visible and hidden, will be displayed. A line style is chosen for hidden lines, and all the tessellation edges of the object are displayed in this line style, both visible and hidden. A different line style is then chosen for visible lines, the depth buffer test is turned back on, and the first technique is performed. This results in overwriting with the visible line style those lines which were in the line style chosen for hidden lines, but are visible.

In accordance with a third aspect of the invention, visible silhouette and intersection edges can be shown alone in a wire-frame image thus eliminating tessellation edges that are not silhouette edges. In this third technique, the first technique is initially utilized, except that the tessellation edges are displayed at a distance behind the visible faces of the object in relation to the viewpoint and using a thicker line to prevent the total obscuring of silhouette edges by the visible faces. Then all intersection edges of the object are displayed, but at a distance in front of the visible faces of the object in relation to the viewpoint to prevent the visible faces from obscuring the visible intersection edges. Again, the distances are preferably determined dynamically by an epsilon-based transformation resulting in a change in the depth translation coordinates in the viewing matrix.

A fourth aspect of the present invention allows a wire-frame image of one or more objects to be rendered with visible silhouette and intersection edges shown in a first line style, and hidden silhouette and intersection edges shown in a different line style. In this fourth technique, a line style desired for hidden lines is first chosen. Then for each object in turn, assuming multiple objects, the following steps are performed. (Note that the same steps are performed if there is only one object.) The third technique is utilized, except that the intersection edges are not displayed. This results in the visible silhouette edges of each object as if alone being displayed in the hidden line style. Then, the visible intersection edges are displayed in the hidden line style. Next, all depth buffer storage locations are set to the farthest position possible in relation to the viewpoint to prevent the obscuring of each object's silhouette edges by any other object. Then, for all objects, assuming multiple objects, the following steps are each performed in turn. (Note that the same steps are performed if there is only one object.) A visible line style is chosen, and the third technique is performed. This results in the visible silhouette and intersection edges being overwritten in the visible line style, while retaining the hidden silhouette and intersection edges in the hidden line style. The distances are preferably determined in the same manner as in the other techniques.

These and other objects, features and advantages of this invention will become apparent from the following detailed description of presently preferred embodiments of the invention, taken in conjunction with the accompanying drawings.

BRIEF DESCRIPTION OF THE DRAWINGS

FIG. 9(a) is a graphical view of the depth buffer in the fourth technique after scanconverting the cylinder of FIG. 2(a).

FIG. 9(b) is a cross-sectional view of the cube and cylinder of FIG. 2(a) at the plane after tessellation edges of the cylinder are displayed a distance back in thick, dashed line style in the fourth technique.

FIG. 9(c) is a cross-sectional view of the cylinder of FIG. 9(b) and a graphical view of the depth buffer with respect to the cube of FIG. 2(a) after scanconverting the cube.

FIG. 9(d) is a cross-sectional view of the cube and cylinder of FIG. 2(a) at the plane after tessellation edges of the cube are displayed a distance back in thick, dashed line style in the fourth technique.

DETAILED DESCRIPTION OF THE PREFERRED EMBODIMENT

Overview

The preferred embodiments herein described consists of four related techniques to achieve the objects of the invention as previously set forth. The first technique displays only visible tessellation edges. The second technique displays the visible tessellation edges in one line style (e.g. solid), and the hidden tessellation edges in a different line style (e.g. dashed). The third technique displays only the visible silhouette and intersection edges. Finally, the fourth technique builds on the third by providing for the display of hidden silhouette and intersection edges in a different line style than the visible silhouette and intersection edges.

Implementation

Figure 1:
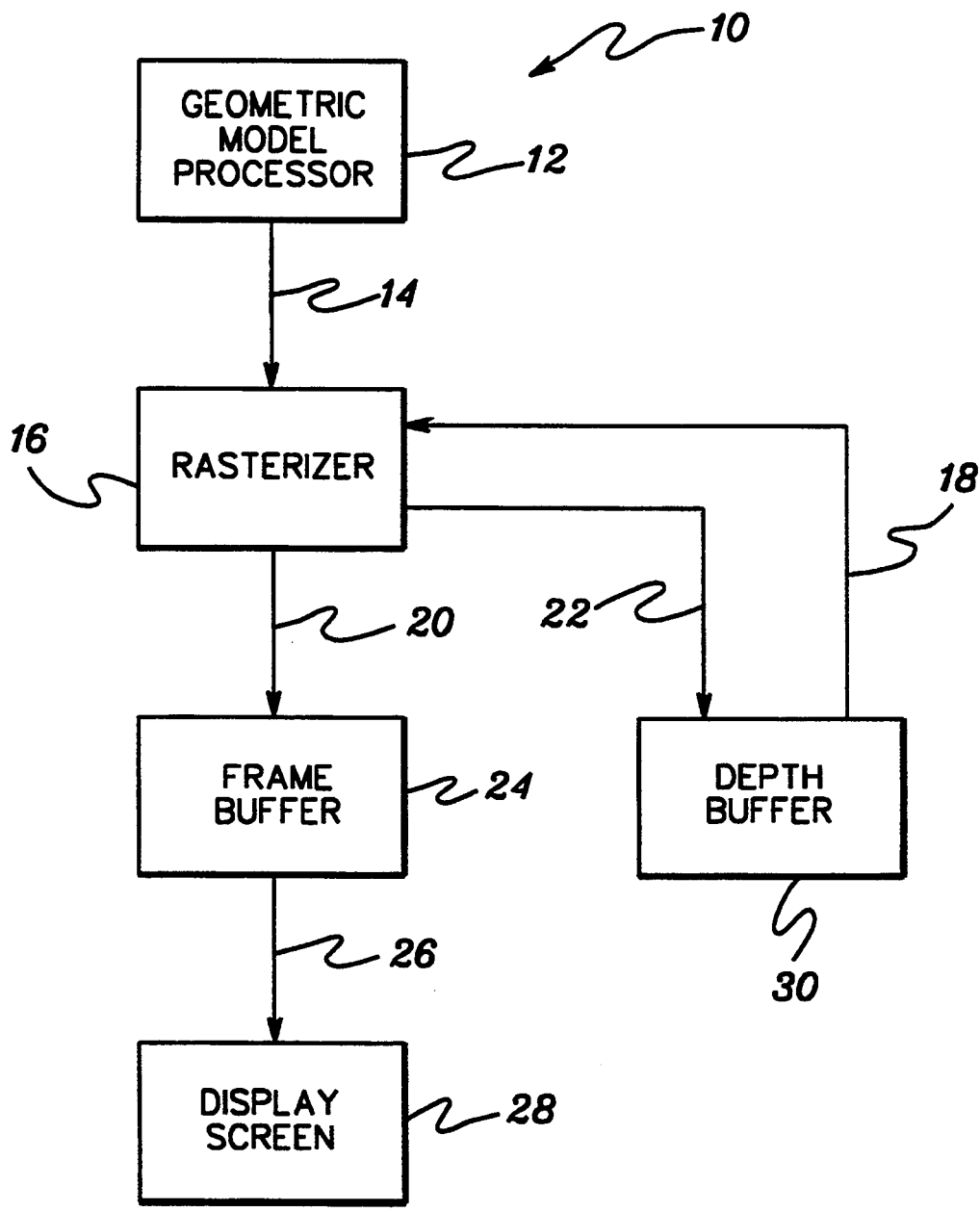
FIG. 1 is a general block diagram of a typical graphics display system.

FIG. 1 depicts in block diagram form a typical graphics display system 10. The system includes a geometric model processor 12, a rasterizer 16, a frame buffer 24, and a display screen 28 arranged in series. A depth buffer 30 is connected to rasterizer 16.

The geometric model processor 12 accepts digital data representative of coordinates of vertices of the object or objects ultimately to be displayed. Normally, the Cartesian coordinate system is used, with X and Y coordinates specifying a pixel location on the display screen and corresponding addresses in the depth and frame buffers, and the Z coordinate representing a distance from the viewpoint to be stored in the depth buffer. Processor 12 processes the vertex data to produce output data 14 representing a tessellated version of the object or objects. Tessellation is a process whereby any curved face is replaced by a piecewise planar approximation consisting of a connected mesh of facets. A facet is a polygon, a number of which together approximate a curved face of an object. A face is defined as any discrete portion of an object, for example a cube has six faces, and a cylinder has three faces (a top, a bottom, and the curved section connecting them).

Rasterizer 16 receives and performs a number of operations on the tessellated object data 14. Initially, the data is mapped into a viewing matrix. The data is then transformed into data representing a two-dimensional projection of the object onto a view plane. The data then goes through a scanconversion process, whereby for each pixel on the view screen, a depth value and an associated color value are obtained. Each pixel has a corresponding X-Y address location in the frame and depth buffers. The depth value is output along data path 22 to the depth buffer 30 only if it is smaller than the value previously stored in the depth buffer at the address location associated with the pixel in question. This comparison is referred to as the depth value comparison test or simply the depth buffer test. Rasterizer 16 obtains the previous depth value from depth buffer 30 via data path 18. If the rasterizer determines that the new depth value is smaller than the previously stored value, then the depth buffer at the particular storage location is updated to the new depth value, and at the same time a color value associated with that depth value is output to the frame buffer 24 via path 20. This color value is stored at the same address in the frame buffer as the depth value in the depth buffer.

The data stored in the frame buffer 24 is the pixel color data used to create the display. The display screen 28 receives information via path 26 detailing how the pixels will be colored to create the display. Once the display screen receives this data, it can display the object or objects.

In practice, rasterizer 16 may take different forms, depending on the architecture of the particular graphics display system. For example, in systems where a graphics pipeline architecture is utilized, the rasterizer might consist of a geometry pipeline and a scanconverter block. Among other things, the rasterizer is a decisional stage in which the decision whether or not to update the frame and depth buffers 24, 30 is made (i.e. the depth buffer test is performed). There are two modes that the rasterizer can operate in. The first is the testing mode. In this mode, as noted above, the depth buffer test is constantly performed. This ensures that only those parts of the object that are closest to the viewpoint will have color valves stored in the frame buffer (i.e. so the hidden parts are not displayed). The second mode is the test-disable mode. In this mode, the depth buffer test is not performed, and all color values relating to the object are stored in the frame buffer 24. This allows a display which consists of visible portions as well as parts that would be hidden if the object(s) were solid(s) in the real world.

The details of implementation and standard operation of such graphics display systems are well known to those skilled in this art and, accordingly, will not be discussed further herein. The present invention can be incorporated into any such graphics display system, for example, the IBM Risc System 6000 graphics accelerator.

In order to understand the present invention, various embodiments will now be described with reference to typical three-dimensional scenes to be rendered as wire-frame images.

Figure 2A:
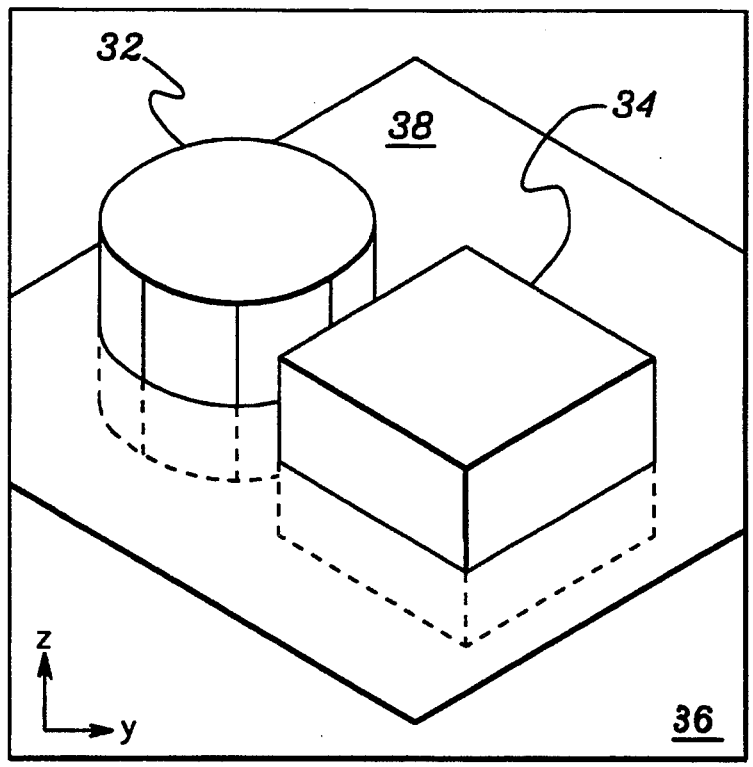
FIG. 2(a) is a three-dimensional scene including a cube and a cylinder, with a cross-sectional plane extending through them, and with X and Y axes defined.

FIG. 2(a) shows a typical three-dimensional scene in two dimensions, here with a cylinder 32 and a cube 34, with X and Y axes defining the image and a plane 38 crossing through the cube and cylinder. The Z axis, though not shown, is parallel to the plane crossing the objects.

Figure 2B:
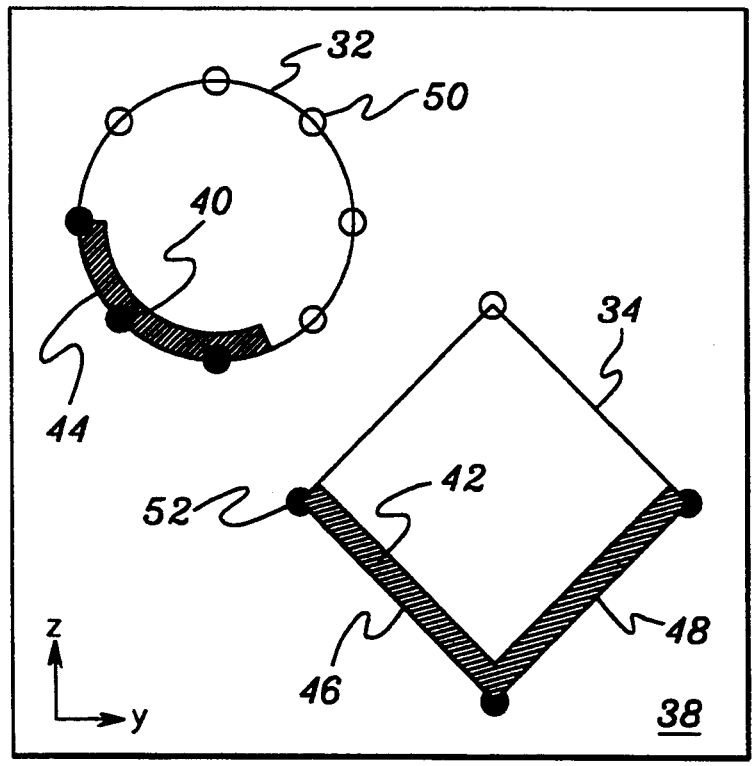
FIG. 2(b) is a cross-sectional view of the scene in FIG. 2(a) at the plane, and with Z and Y axes defined.

FIG. 2(b) is a top view of the plane 38 in FIG. 2(a) with the Z and Y axes defined. The hatched portions 40, 42 of the objects behind their respective faces (44, 46, 48), shown as lines, represent graphically the result of updating the depth buffer 30 during scanconversion, which takes place in the rasterizer 16 of FIG. 1. Any faces or portions thereof that do not have a hatched area (e.g. 40) behind them are hidden, that is they are not seen by a viewer at the chosen view point. A hatched area represents the current minimum values in the depth buffer. The width of a hatched area represents the resolution, in depth, of the depth buffer. The white dots (e.g. 50) represent hidden tessellation edges, and the black dots (e.g. 52) represent visible tessellation edges (i.e. the dots represent the frame of the object).

Figure 11:
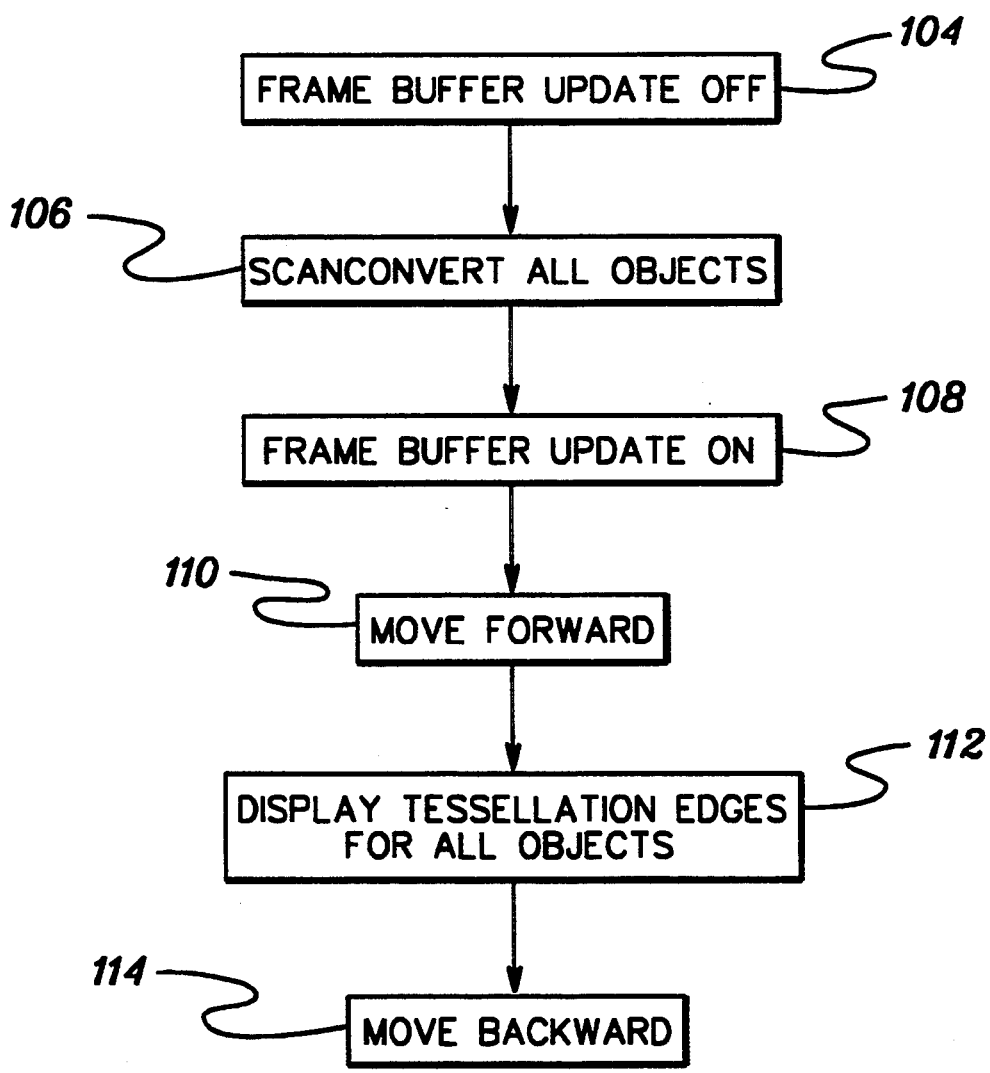
FIG. 11 is a flow diagram of the first technique.

The first technique of the present invention displays visible tessellation edges in solid line style. The steps of the first technique shown in FIG. 11, are:
  Frame Buffer Update (Off) (STEP 104);
  Scanconvert (All Objects) (STEP 106);
  Frame Buffer Update (On) (STEP 108);
  Move (Forward) (STEP 110);
  Display Tessellation Edges (All Objects) (STEP 112);
  Move (Backward) (STEP 114).

Figure 3A:
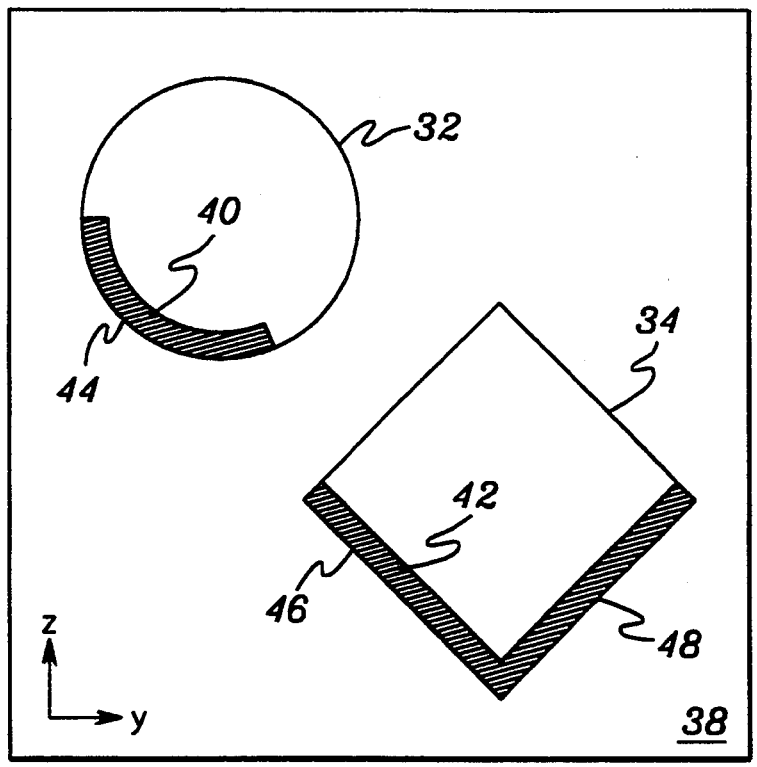
FIG. 3(a) is a graphical view of the depth buffer in the first technique after scanconverting the cube and cylinder of FIG. 2(a).
Figure 3B:
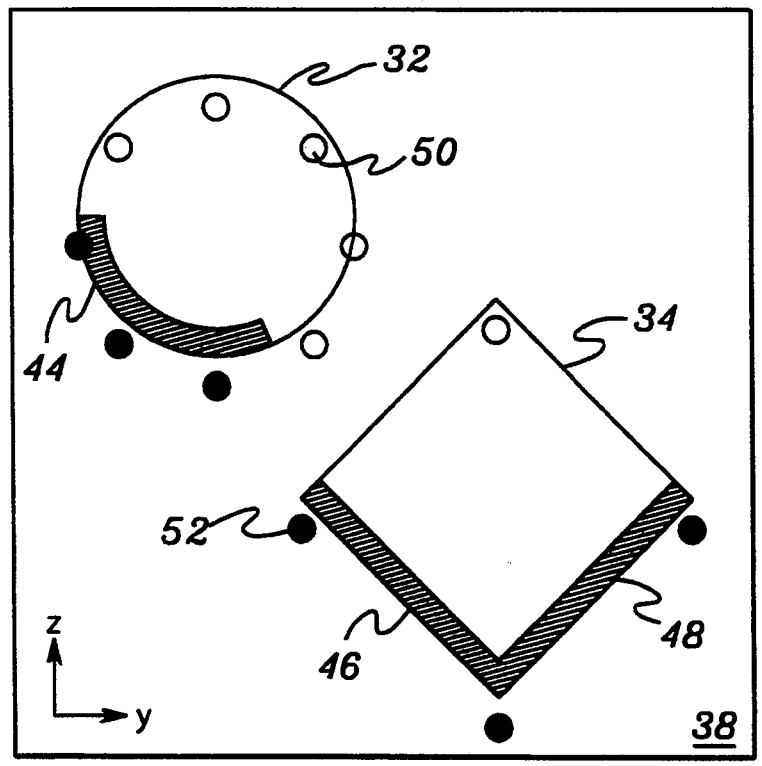
FIG. 3(b) is a cross-sectional view of the result of finishing the performance of the first technique on the cube and cylinder of FIG. 3(a).

FIG. 3(a) and FIG. 3(b) show cross-sectional views at the plane 38 of stages of performing the first technique on the cube 34 and cylinder 32 of FIG. 2(a). FIG. 3(a) shows graphically the state of the depth buffer 30 after scanconverting the cube and cylinder taken together (STEP 106). Scanconverting normally entails obtaining depth values for each pixel covered by the object, performing the depth buffer comparison test, and obtaining color values which correspond to depth buffer values that are the outcome of the depth buffer comparison test. However, due to the masking of the frame buffer 24 (STEP 104), the color values obtained are not stored in the frame buffer and thus there is no display screen 28 change yet. The "All Objects" language refers to the treatment of all objects as one, rather than scanconverting each object as if it were the only one to be displayed.

FIG. 3(b) is a cross-sectional view of the cube and cylinder at the plane 38. The wire-frame of the objects as one (i.e. the dots, e.g. 50, 52) is displayed (STEP 112) at a distance in front of the visible faces (44, 46, 48) so that the visible tessellation edges, the black dots (e.g. 52), are not obscured by visible faces, but the hidden tessellation edges, the white dots (e.g. 50), are obscured by the visible faces.

Step 110 of FIG. 11 is a critical step in the first technique, as it is there that the depth translation coordinates in the viewing matrix are altered to allow display of the wire-frame at a location other than that which corresponds to the faces of the cube and cylinder. A viewing matrix is used to map positional information of an object which allows the object to be viewed from any chosen direction. The information is mapped in matrix form, for example a 4×4 matrix is used in the IBM Risc System 6000 graphics accelerator system. A viewing matrix can exist in general memory or a special memory location which allows quicker access.

The move forward in STEP 110 means move to a location closer by a certain distance to the view point, i.e. a smaller depth value. Actually, nothing is being moved. Rather, the system is changing the location at which further displays will take place. Thus, the distance obtained is subtracted from the depth translation coordinates in the viewing matrix. The distance is obtained dynamically by the use of an epsilon-based transformation:

$$\text{distance} = (Z_{max} - Z_{min})/2^{(n-1)}$$

where $Z_{max}$ is the depth value of the farthest vertex of the object in relation to the viewpoint, $Z_{min}$ is the depth value of the closest vertex of the object in relation to the viewpoint, n is the number of bits allotted for each pixel in the depth buffer 30, and the "$-1$" value of the exponent prevents an equal depth value of the interior of a face (e.g. 46) and an adjacent edge (e.g. 52) caused by rounding depth values during scanconversion in STEP 106. STEP 114 merely resets the system at the previous location for display by adding the distance to the altered depth translation coordinates in the viewing matrix.

All of the recited steps of this first technique are readily implemented with conventional instructions using existing graphics display hardware by those skilled in this art.

Figure 4:
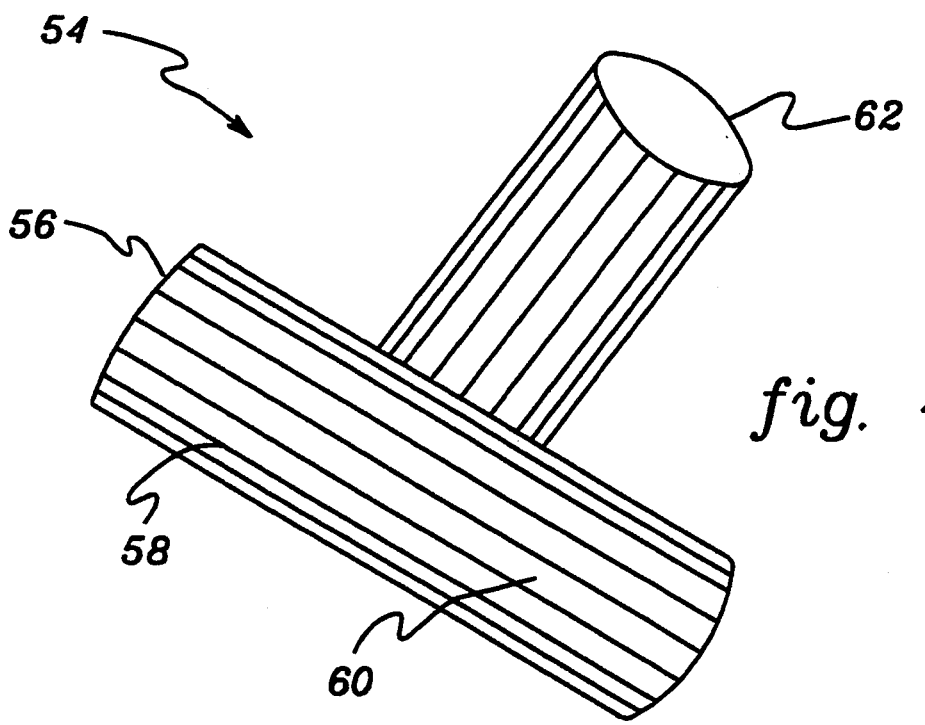
FIG. 4 is an example of the result of performing the first technique on two cylinders as shown on a display screen.

An example of the result of performing the first technique is shown in FIG. 4. There, the final image 54 is two cylinders, 56 and 62, in tessellated wireframe format. As the figure shows, tessellation edges (e.g. 58) approximate the visible curved face of each cylinder, and each facet (e.g. 60) is bounded by tessellation edges. Notice that the internal structure of each cylinder is not shown. In addition, it is not known from the figure how far the cylinder 62 in back extends, due to obscuring by the cylinder 56 in front. This may be the desired rendition for some purposes, and not for others. The next technique meets both potential needs.

Figure 12:
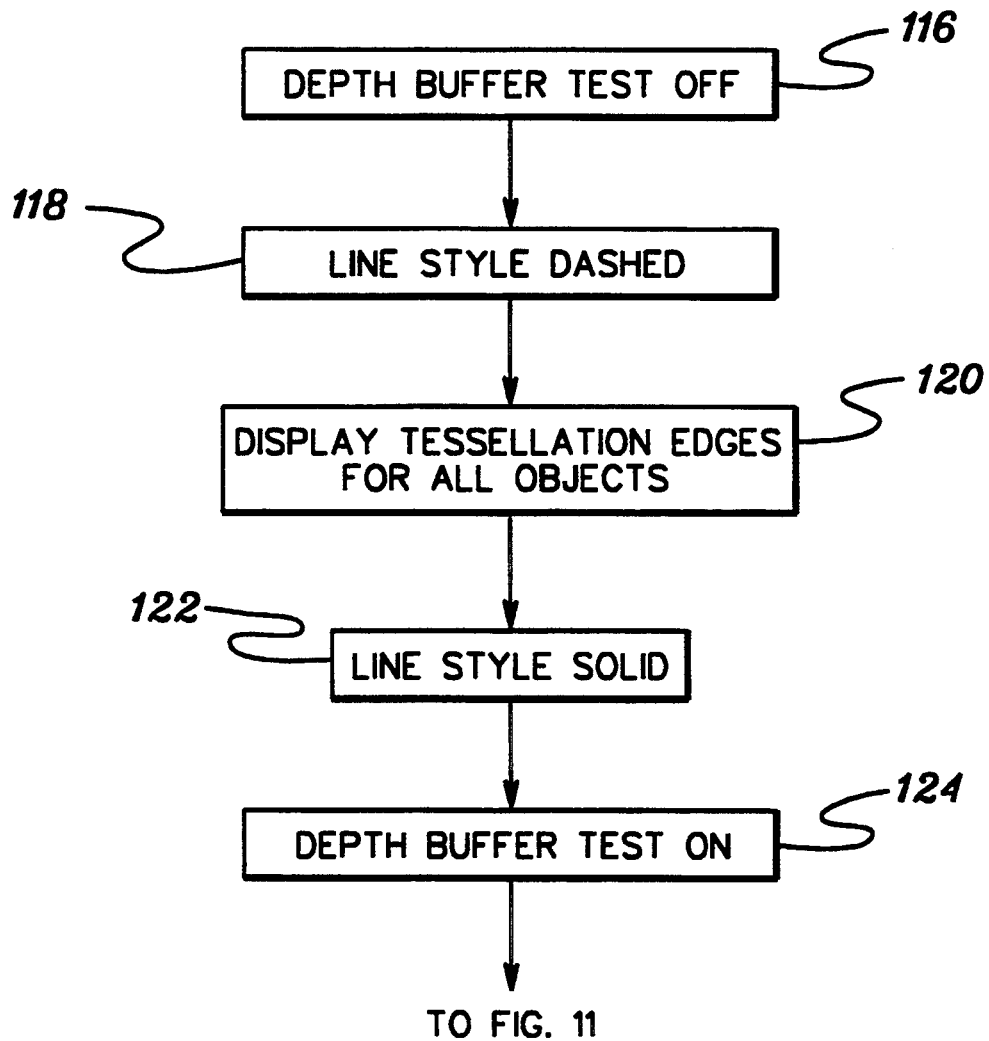
FIG. 12 is a flow diagram of the second technique incorporating the first technique of FIG. 11.

The second technique displays both visible and hidden tessellation edges; e.g. visible in solid lines and hidden in dashed lines. The steps of this second technique shown in FIG. 12 and incorporating the steps of FIG. 11, are:

Depth Buffer Test (Off) (STEP 116);
Line Style (Dashed) (STEP 118);
Display Tessellation Edges (All Objects) (STEP 120);
Line Style (Solid) (STEP 122);
Depth Buffer Test (On) (STEP 124);
Frame Buffer Update (Off) (STEP 104 of FIG. 11);
Scanconvert (All Objects) (STEP 106 of FIG. 11);
Frame Buffer Update (On) (STEP 108 of FIG. 11);
Move (Forward) (STEP 110 of FIG. 11);
Display Tessellation Edges (All Objects) (STEP 112 of FIG. 11);
Move (Backward) (STEP 114 of FIG. 11).

Figure 5A:
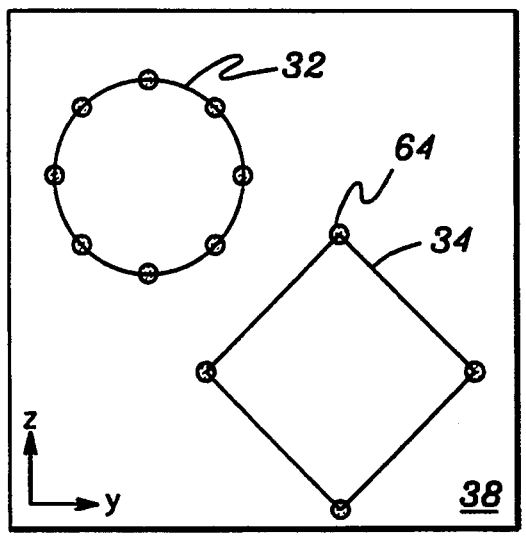
FIG. 5(a) is a cross-sectional view of the cube and cylinder of FIG. 2(a) at the plane after tessellation edges are displayed in dashed line style in the second technique.
Figure 5B:
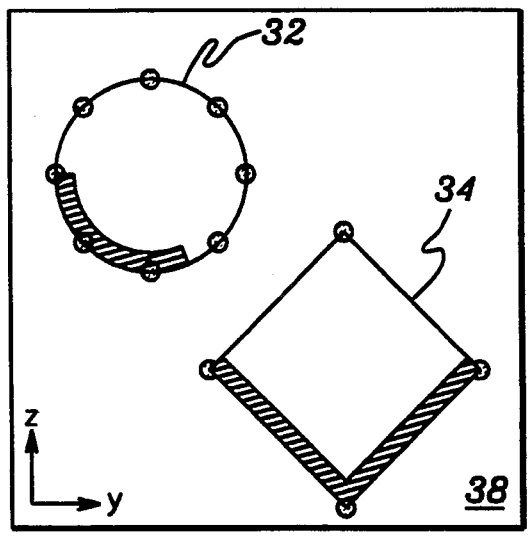
FIG. 5(b) is a view of the cube and cylinder of FIG. 5(a) after scanconversion in the second technique.
Figure 5C:
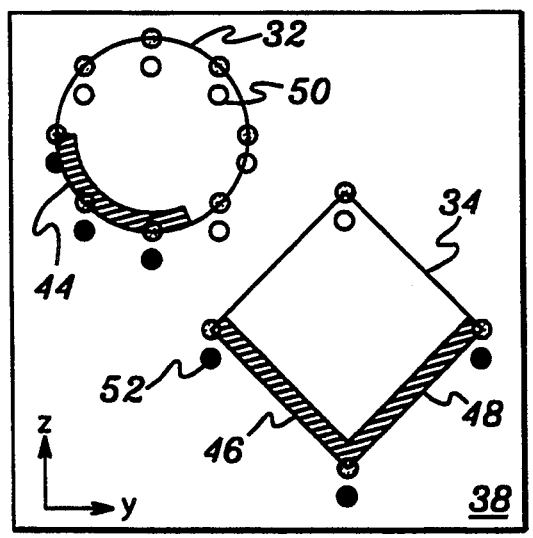
FIG. 5(c) is a cross-sectional view of the result of completing the performance of the second technique on the cube and cylinder of FIG. 5(b).

FIGS. 5(a)–5(c) show cross section views at the plane 38 of stages of performing the second technique on the cube 34 and cylinder 32 of FIG. 2(a). FIG. 5(a) shows the result of STEPS 116 through 124 in the second technique. The grey dots (e.g. 64) indicate all tessellation edges, both visible and hidden, are displayed (STEP 120) in dashed line style (STEP 118). All tessellation edges are able to be displayed, because the depth buffer test is disabled in STEP 116. STEP 122 resets the line style and STEP 124 turns the depth buffer test back on. STEPS 104–114 are the steps of the first technique performed on the cube and cylinder of FIG. 5(a).

FIG. 5(b) shows graphically the state of the depth buffer 30 after scanconverting the cube and cylinder of FIG. 5(a) in STEP 106 of the second technique. Note, again, that the hatched areas are not seen on the display screen 28 and merely represent the resolution of the depth buffer.

FIG. 5(c) is a cross-sectional view of the cube and cylinder at the plane 38 after completion of the second technique. The tessellation edges of the objects (i.e. the dots, e.g. 50, 52) are displayed at a distance in front of the faces of the object so that the visible tessellation edges, shown by the black dots (e.g. 52), are not obscured by visible faces (44, 46, 48), but the hidden tessellation edges, the white dots (e.g. 50), are obscured by the visible faces. The result is that visible tessellation edges of the objects together are overwritten in solid line style, and the hidden tessellation edges remain in dashed line style obtained in STEP 120.

As in the previous technique, all of the steps of this second technique can be easily implemented using existing hardware in commercially available graphics display systems.

Figure 6:
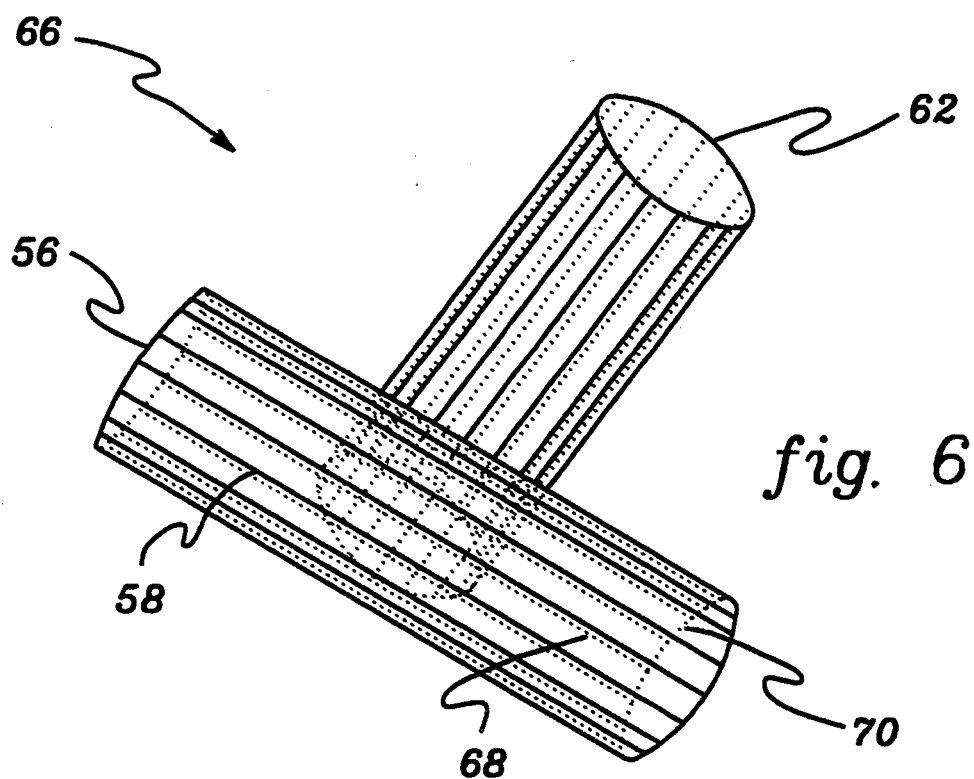
FIG. 6 is an example of the result of performing the second technique on two cylinders as shown on a display screen.

FIG. 6 shows an example of the result of performing the second technique on two cylinders. A different image 66 of the same cylinders, 56 and 62 of FIG. 4, is shown. Tessellation edges (e.g. 68 and 70) not viewable if the cylinders were solids, as shown in FIG. 4, are presented in dashed line style, while those tessellation edges that are visible (e.g. 58) are shown in solid line style (i.e. the same lines as shown in FIG. 4). Notice that the internal structures of the cylinders are shown, and the part of the cylinder 62 in back obscured by the cylinder 56 in front in FIG. 4 can now be viewed.

Figure 13:
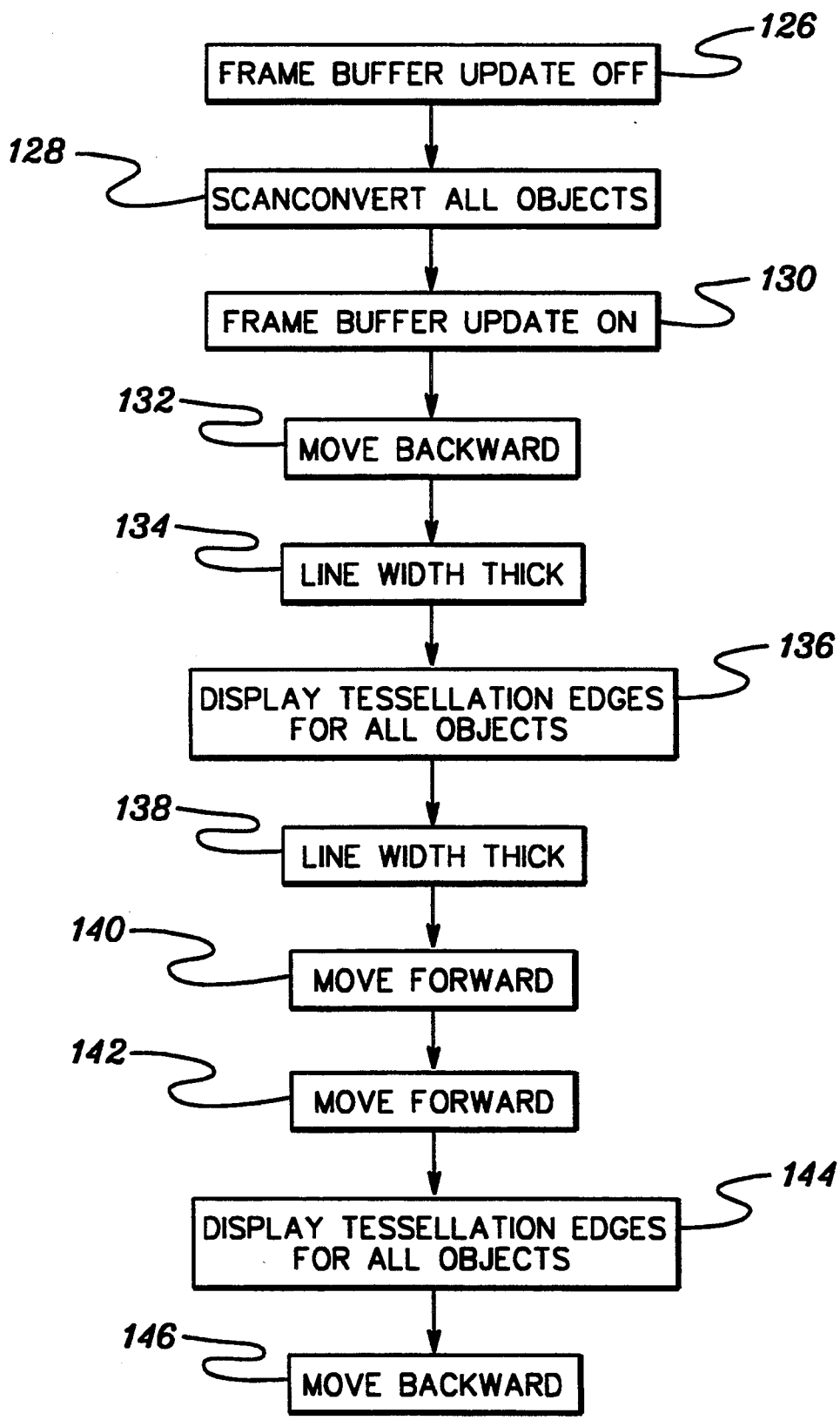
FIG. 13 is a flow diagram of the third technique.

The third technique implemented according to the principles of the present invention displays visible silhouette and intersection edges in a selected, e.g. solid, line style. The steps of the third method, shown in FIG. 13, are:

Frame Buffer Update (Off) (STEP 126);
Scanconvert (All Objects) (STEP 128);
Frame Buffer Update (On) (STEP 130);
Move (Backward) (STEP 132);
Line Width (Thick) (STEP 134);
Display Tessellation Edges (All Objects) (STEP 136);
Line Width (Thin) (STEP 138);
Move (Forward) (STEP 140);
Move (Forward) (STEP 142);
Display Intersection Edges (All Objects) (STEP 144);
Move (Backward) (STEP 146).

Figure 7A:
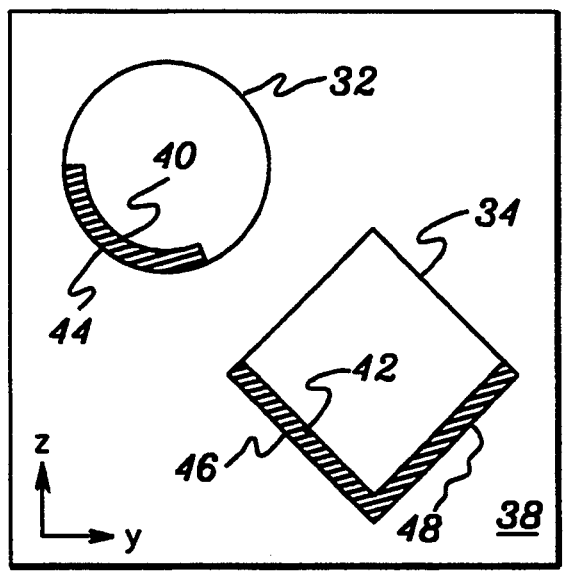
FIG. 7(a) is a graphical view of the depth buffer in the third technique after scanconverting the cube and cylinder of FIG. 2(a).
Figure 7B:
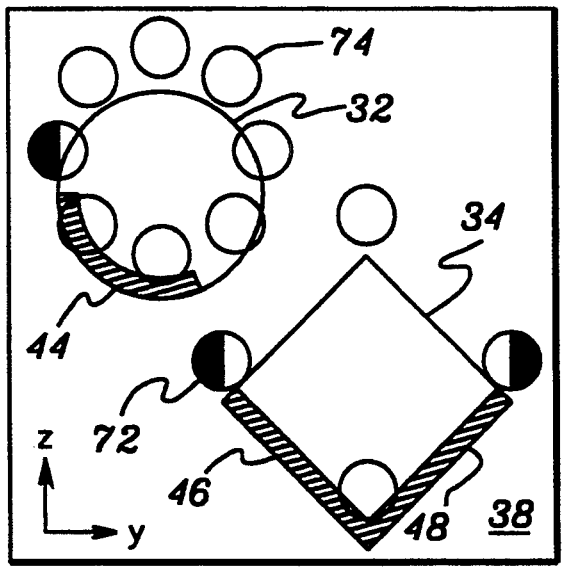
FIG. 7(b) is a cross-sectional view of the cube and cylinder of FIG. 2(a) at the plane after tessellation edges are displayed a distance back in thick lines in the third technique.
Figure 7C:
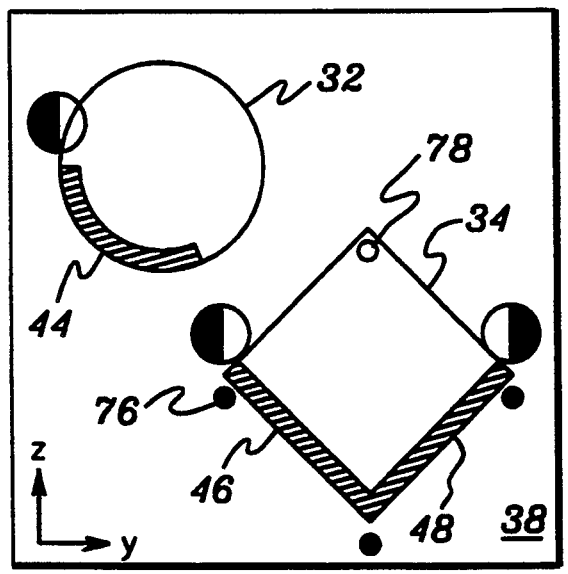
FIG. 7(c) is a cross-sectional view of the result of finishing the performance of the third technique on the cube and cylinder of FIG. 7(b).

FIGS. 7(a)–7(c) show various stages at the plane 38 of performing the third technique on the cylinder 32 and cube 34 of FIG. 2(a). FIG. 7(a) shows the status of the depth buffer 30 graphically, representing completion of STEPS 126, 128 and 130 in the third technique. The frame buffer 24 is masked in STEP 126 to prevent color values from being written into it, and thus prevents display on the display screen 28. The depth buffer is updated in STEP 128 only if the depth value obtained in scanconversion is smaller than the depth value previously stored for a given pixel covered by the projection of the object. The "All Objects" command in STEP 128 refers to all objects being treated as one ultimate display object. In STEP 130, the frame buffer is unmasked to allow color values to be written to it.

FIG. 7(b) corresponds to the performing of STEPS 132 through 140 of the third technique. Shown there are the tessellation edges (the dots, e.g. 72 and 74) of the cube 34 and cylinder 32 displayed at a distance back from the visible faces (44, 46, 48) of the objects. The dots are larger than in previous figures, indicating that a line width of more than one pixel has been chosen in STEP 134 of the third technique. Again, purely white dots (e.g. 74) represent tessellation edges that are hidden. The dots that are half black and half white (e.g. 72) indicate silhouette edges that have been partially obscured by the visible faces. The larger line width ensures that this partial obscuring does not prevent the silhouette edges from being visible. STEP 132 is a critical step in this phase of the third technique, as it is there that the depth translation coordinates in the viewing matrix are altered to allow display at a location other than that which corresponds to the faces of the cube and cylinder. The distance obtained is added to the depth translation coordinates here, as it is a move backward, away from the view point. The distance is obtained dynamically by the use of the epsilon-based transformation previously disclosed. STEPS 138 and 140 are really just returning the system 10 to the normal number of pixels for line width (STEP 138) and the normal depth translation coordinates in the viewing matrix (STEP 140) in contemplation of further display.

FIG. 7(c) shows a cross-sectional view of the cube 34 and cylinder 32 of FIG. 7(b) at the plane 38 after STEPS 142 through 146 of the third technique have been performed. The hidden tessellation edges (e.g. 74) of FIG. 7(b) have been removed for visualization purposes. In STEPS 140 and 142, two move forwards are accomplished in the system 10 by first obtaining a distance using the aforementioned epsilon-based transformation and twice subtracting the distance obtained from the depth translation coordinates in the viewing matrix. Two forward moves are required as the viewing matrix has already been altered by the move backward in STEP 132. One move forward resets, and the other achieves the desired forward move. As earlier indicated, nothing is being moved. Rather, the system is changing the location at which further displays will take place. Thus, in STEP 144 when the intersection edges (the dots, e.g. 76, 78) of all objects together are displayed, they are displayed in front of the visible faces (44, 46, 48) of the objects to ensure that those intersection edges that are visible (the black dots, e.g. 76) are not obscured by the visible faces they correspond to (e.g. intersection edge 76 and visible face 46). Recall that intersection edges are edges where faces intersect, so that none are shown in front of the cylinder due to the viewing perspective. The move backward in STEP 146 is another case of resetting the system for further display.

Figure 8:
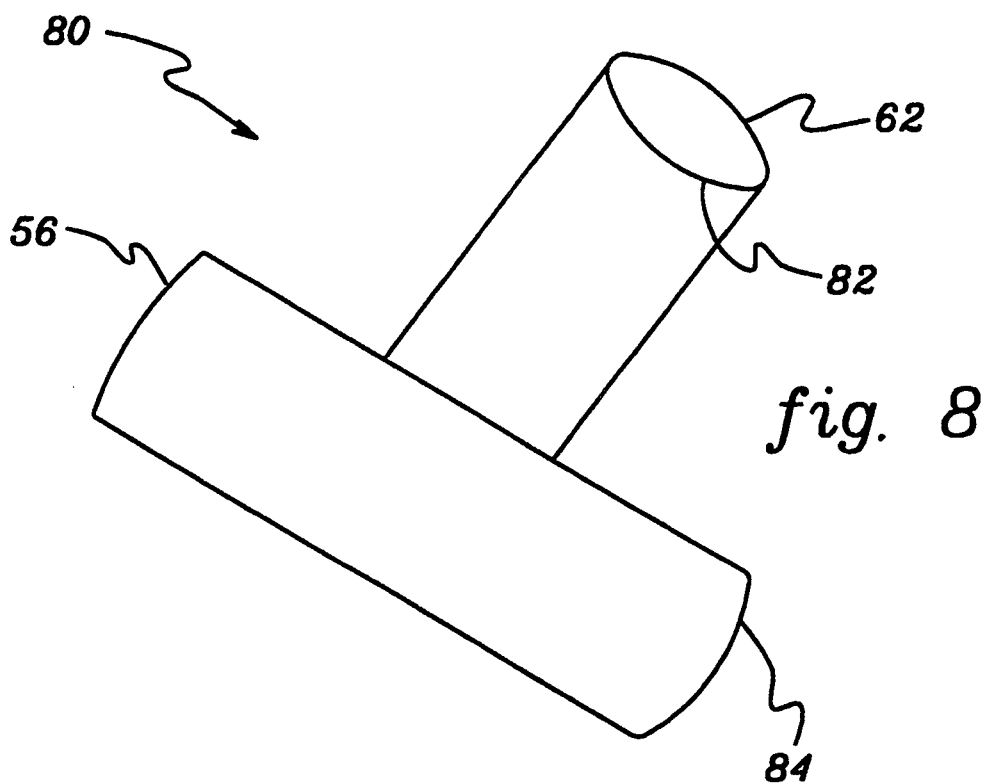
FIG. 8 is an example of performing the third technique on two cylinders as shown on a display screen.

An example of the result of performing the third technique is shown in FIG. 8. Yet another image 80 of the cylinders 56, 62 seen in FIG. 4 and FIG. 6 is displayed. Only visible silhouette and intersection edges are shown. Edge 82 is an example of an intersection edge. All other edges shown in the image are silhouette edges, although edges like 84 are also intersection edges. It should also be noted that both intersection and silhouette edges are special cases of tessellation edges. Again, implementation of the steps of this third technique will be straightforward to those familiar with the capabilities of existing computer graphics display systems.

Figure 14:
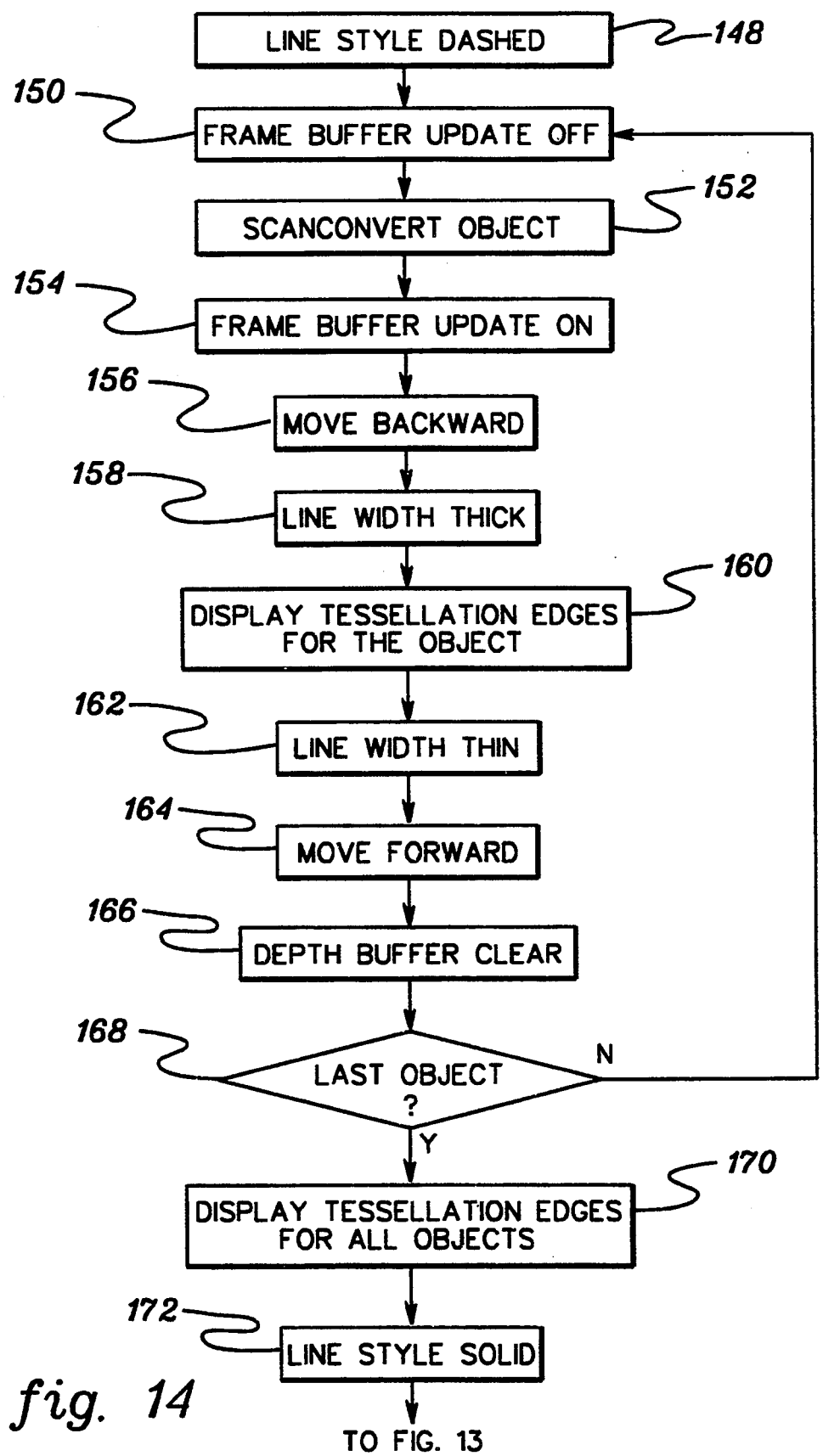
FIG. 14 is a flow diagram of the fourth technique incorporating the third technique of FIG. 13.

The fourth technique implemented according to the principles of the present invention builds on the third by adding hidden silhouette and intersection edges to the visible silhouette and intersection edges obtainable by performing the third technique. The steps of the fourth technique, shown in FIG. 14 and incorporating the steps of FIG. 13, are:

---

Line Style (Dashed) (Step 148);
For Each Object in All Objects Do (see Inquiry 168)
  Begin
  Frame Buffer Update (Off) (Step 150);
  Scanconvert (Object) (Step 152);
  Frame Buffer Update (On) (Stop 154);
  Move (Backward) (Step 156);
  Line Width (Thick) (Step 158);
  Display Tessellation Edges (Object) (Step 160);
  Line Width (Thin) (Step 162);
  Move (Forward) (Step 164);
  Depth Buffer Clear (Step 166);
End
Display Intersection Edges (All Objects) (Step 170);
Line Style (Solid) (Step 172);
Frame Buffer Update (Off) (Step 126 of FIG. 13);
Scanconvert (All Objects) (Step 128 of FIG. 13);
Frame Buffer Update (On) (Step 130 of FIG. 13);
Move (Backward) (Step 132 of FIG. 13);
Line Width (Thick) (Step 134 of FIG. 13);
Display Tessellation Edges (All Objects) (Step 136 of FIG. 13);
Line Width (Thin) (Step 138 of FIG. 13);
Move (Forward) (Step 140 of FIG. 13);
Move (Forward) (Step 142 of FIG. 13);
Display Intersection Edges (All Objects) (Step 144 of FIG. 13);
Move (Backward) (Step 146 of FIG. 13);

---

Figure 9E:
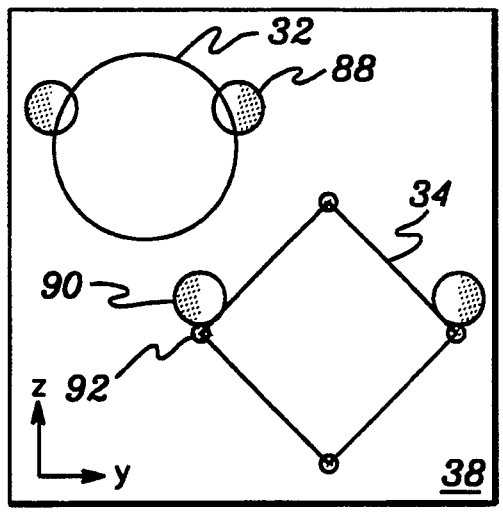
FIG. 9(e) is a cross-sectional view of the cube and cylinder of FIG. 9(d) after intersection edges are displayed in dashed line style for both objects in the fourth technique.

FIGS. 9(a)-9(h) are cross-sectional views of the cube 34 and cylinder 32 at the plane 38 of FIG. 2(a) during various stages of the performance of the fourth technique. Note that STEPS 150 through 166 are performed for each object in turn as if it were alone Thus, the addition of INQUIRY 168, "LAST OBJECT?", in FIG. 14. FIG. 9(a) is a graphical view of the depth buffer 30 contents after STEP 154 has been completed for the cylinder. The results of STEPS 156 through 164 performed on the cylinder as if alone are presented by FIG. 9(b). The tessellation edges (the dots, e.g. 86, 88) have been displayed (STEP 160) a distance behind (STEP 156) the visible face 44 of the cylinder in a thick (STEP 158), dashed line style (set in STEP 148). As in the third technique, the thick line style is chosen to ensure the silhouette edges (e.g. 88) of the cylinder are not obscured by an adjacent face (e.g. 44).

FIG. 9(c) is the cylinder 32 of FIG. 9(b) without the hidden tessellation edges (e.g. 86). FIG. 9(c) is also a graphical view of the depth buffer contents after being cleared, i.e. set to the largest depth value possible given the chosen viewpoint, in STEP 166 and after STEPS 150 through 154 are repeated for the cube 34. FIG. 9(d) is the result of completing the fourth technique up to STEP 170. The silhouette edges (e.g. 88, 90) of both the cube and cylinder have been displayed in dashed line style. Notice that no silhouette edges of either object are obscured by the other, because each has been processed separately. It is in this way that hidden silhouette edges are obtained.

Figure 9F:
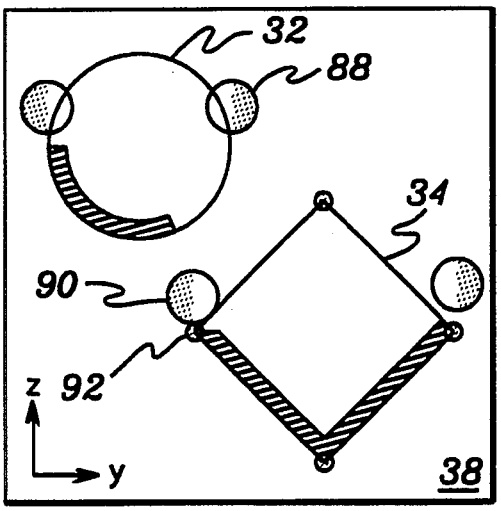
FIG. 9(f) is a cross-sectional view of the cube and cylinder of FIG. 9(e) after scanconverting both at once in the fourth technique.

The results of STEP 126 of the fourth technique are illustrated in FIG. 9(e). The intersection edges (e.g. 92) of the cube 34 and cylinder 32 together are displayed in dashed line style. This achieves the objective of obtaining and displaying the hidden intersection edges. As the depth buffer 30 has been cleared in the last pass over step 12, the objects are together scanconverted (step 17) with the frame buffer 24 masked (STEP 130) to prevent new color values from being written to it that are normally obtained during scanconversion. FIG. 9(f) is the cube and cylinder of FIG. 9(e) with a graphical view of the depth buffer 30 contents after scanconversion of both together. After scanconversion, the frame buffer is unmasked (STEP 134).

Figure 9G:
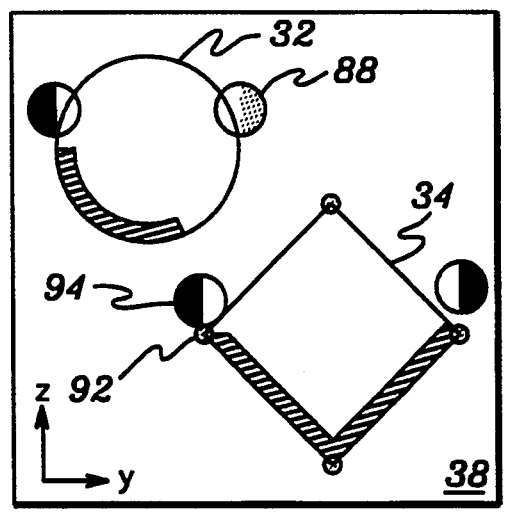
FIG. 9(g) is a cross-sectional view of the cube and cylinder of FIG. 9(f) after displaying tessellation edges of both objects in thick, solid line style a distance back in the fourth technique.

The visible silhouette edges (e.g. 94) of the cube 34 and cylinder 32 taken together are obtained in STEPS 136 through 144 of the fourth technique, and displayed as shown in FIG. 9(g). STEPS 136 and 138 of the fourth technique are the set-up for displaying the visible silhouette edges in STEP 140. In STEP 136 of the fourth technique, as in prior techniques, a distance is obtained by the epsilon-based transformation previously described and added to the depth translation coordinates in the viewing matrix. A move backward (away from the viewpoint) is a farther distance, hence the addition. In STEP 138 of the fourth technique, a line width of more than one pixel is again chosen to prevent obscuring of the silhouette edges by adjacent faces. STEPS 142 and 144 of the fourth technique reset the system 10 for further display.

Figure 9H:
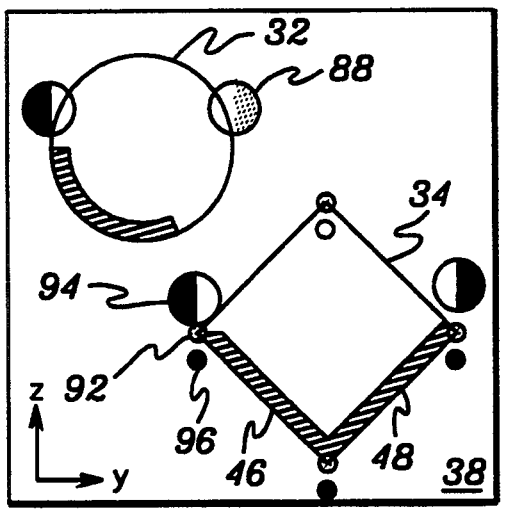
FIG. 9(h) is a cross-sectional view of the cube and cylinder of FIG. 9(g) after displaying intersection edges of both objects a distance forward in solid line style.

STEPS 146 through 150 complete the fourth technique and serve the objective of displaying the visible intersection edges of the cylinder 32 and cube 35 taken together. FIG. 9(h) shows the cube and cylinder of FIG. 9(g) with visible intersection edges (e.g. 96) in solid line style a distance in front of the visible faces 46, 48. Again, STEP 150 of the fourth technique resets the system 10 after the move forward in STEP 148. Note that this two pass technique first obtains all silhouette and intersection edges, both visible and hidden, in dashed line style, then overwrites those edges that are visible edges in solid line style.

Figure 10:
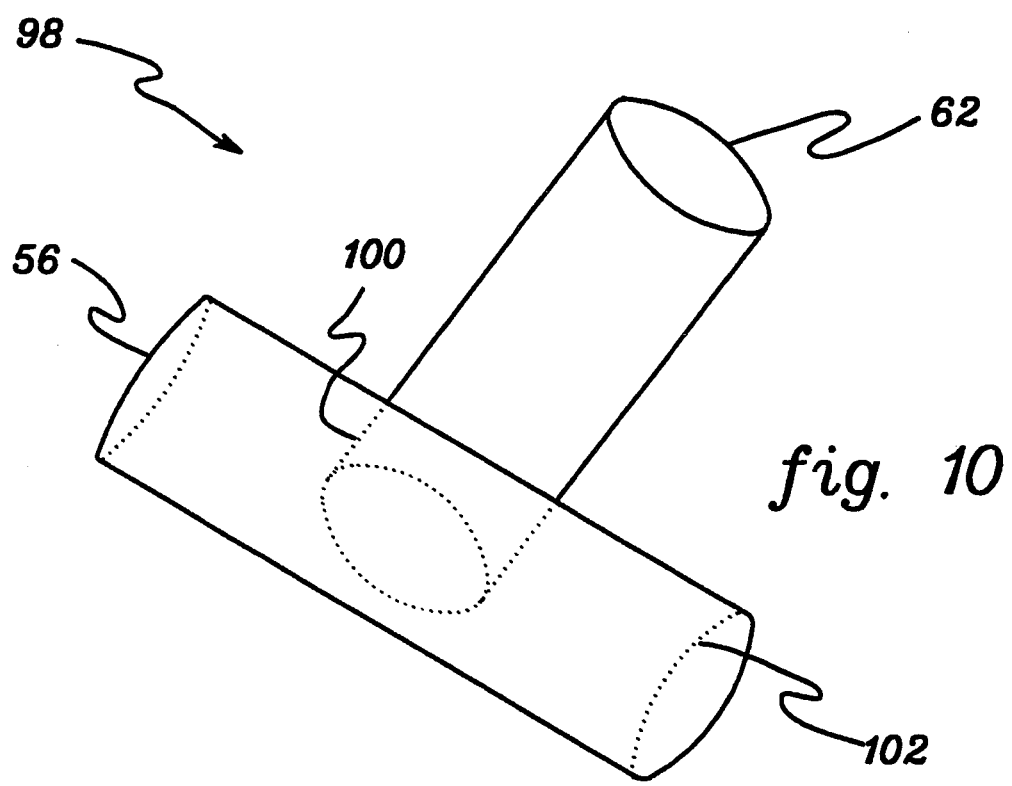
FIG. 10 is an example of the result of performing the fourth technique on two cylinders as shown on a display screen.

FIG. 10 shows an example of the result of performing the fourth technique. A final image 98 of the two cylinders, 56 and 62, is shown which builds on the image 80 of FIG. 8. As seen in the figure, hidden silhouette (e.g. 100) and intersection (e.g. 102) edges in dashed lines have been added to FIG. 8. This image represents the minimum lines necessary for the intuitive understanding of the position, extent and depth ordering of both cylinders.

The techniques disclosed herein may be implemented on a typical graphics display system by the addition of functions or procedures. For example, the first technique may be implemented on an IBM Risc System 6000 graphics accelerator, and an implementation in the C programming language may take the following form:

```
int GVLineDisplayH(GV gv, Line line)
{
    int mode;
    /* move backward and fill z-buffer */
    mode = Z_BUFFER_ONLY;
    GRLineStyleSet(0);
    GRMove(GVDZH(gv));
    LineVisitGeo(line, NULL, NULL, CellDisplay, &mode);
    GRMove(-GVDZH(gv));
    /* draw wireframe */
    mode = WIREFRAME;
    LineVisitGeo(line, NULL, NULL, CellDisplay, &mode);
}
```

As another example, the second technique may be implemented on an IBM Risc System 6000 graphics accelerator through addition of a function or procedure, which may be implemented in the C programming language in the following form:

```
int GVLineDisplayHD(GV gv, Line line)
{
    int mode;
    /* display with hidden lines removed */
    GVLineDisplayH(gv, line);
    /* draw wireframe again in dashed */
    GRZbuffer(0);
    GRLineStyleSet(1);
    mode = WIREFRAME;
    LineVisitGeo(line, NULL, NULL, CellDisplay, &mode);
    GRZbuffer(1);
    GRLineStyleSet(0);
}
```

As a further example, the third technique may be implemented on an IBM Risc System 6000 graphics accelerator through addition of a function or procedure which may be implemented in the C programming language in the following form:

```
int GVLineDisplayC(GV gv, Line line)
{
    int mode;
    /* fill Z-buffer */
    mode = Z_BUFFER_ONLY;
    GRMove(-GVDZC(gv));
    LineVisitGeo(line, NULL, NULL, CellDisplay, &mode);
    GRMove(GVDZC(gv));
    /* draw wireframe and hard edges*/
    mode = WIREFRAME;
    GRLineWidthSet(2*GVLineWidth(gv));
    LineVisitGeo(line, NULL, NULL, CellDisplay &mode);
    GRMove(-2*GVDZC(gv));
    LineVisitGeo(line, NULL, NULL, CellEdgesDisplay, &mode);
    GRMove(2*GVDZC(gv));
    GRLineWidthSet(GVLineWidth(gv));
}
```

As a final example, the fourth technique may be implemented on an IBM Risc System 6000 graphics accelerator through addition of a function or procedure which may be implemented in the C programming language in the following form:

```
{
    int mode;
    /* display the contour of a primitive in dashed */
    mode = Z_BUFFER_ONLY;
    GRMove(-GVDZC(gv));
    CellDisplay(cell, &mode);
    GRMove(GVDZC(gv));
    mode = WIREFRAME;
    GRLineStyleSet(1);
    GRLineWidthSet(2*GVLineWidth(gv));
    CellDisplay(cell, &mode);
    GRLineStyleSet(0);
    GRLineWidthSet(GVLineWidth(gv));
    GRZbufferClear();
}
int GVLineDisplayCD(GV gv, Line line)
{
    int mode;
    /* soft edges in dashed*/
    LineVisitGeo(line, NULL, NULL, GVCellDisplayCD, gv);
    /*display the contour of the whole assembly */
    GVLineDisplayC(gv, line);
    mode = WIREFRAME;
    GRLineStyleSet(1);
    GRZbuffer(0);
    LineVisitGeo(line, NULL, NULL, CellEdgesDisplay, &mode);
    GRZbuffer(1);
    GRLineStyleSet(*0);
    GRMove(-2*GVDZC(gv)):
    LineVisitGeo(line, NULL, NULL, CellEdgesDisplay, & mode);
    GRMove(2*GVDZC(gv));
}
```

The present invention, as embodied in the techniques described herein, improves on the prior art by offering display alternatives in graphics display systems that can be rendered in real time without additional hardware. Hidden line removal in wire-frame images of tessellated objects, while available via prior art methods can now be performed faster and with no additional hardware. Display of hidden lines in a different line style than visible lines is now possible in real time. The problem of distinguishing silhouette edges from other tessellation edges has been solved in real time. Also hidden silhouette edges can be distinguished and shown in a different line style than that of visible silhouette edges. In addition, the present invention does not require edge-face adjacency information. Key benefits of the present invention are its low cost, due to no additional hardware changes, and real time rendering capability.

It will be appreciated that, although specific embodiments of the invention have been described herein for purposes of illustration, various modifications may be made without departing from the spirit and scope of the invention. In particular, for example, the function of masking the frame buffer may be obtained by temporarily selecting an alternate frame buffer (usually used for double buffering) during scanconversion and the depth buffer comparison test. Also, the line styles used in the preferred embodiment, solid and dashed, may be replaced by, for example, using different colors or intensities or line widths. Further, the consecutive forward moves in the third technique may be achieved by multiplying the distance by two. Also, some steps may be interchangeable in terms of ordering. For example, STEPS 122 and 124 in the second technique may be performed in reverse order without affecting the ultimate objective of the technique, and STEP 138 of the third technique may be performed after STEPS 140 and 142 without affecting the outcome. In addition, color monitors are not necessary to perform this method, as monochrome screens use shades of one color to act as different colors. Also, wire-frame imaging could be combined with other functions, such as shading, without losing the ability to make out the wire-frame itself. As a final example, where visible tessellation edges are displayed, scanconversion could be done at a distance back from the normal position, and then the frame could be displayed in the normal position. Accordingly, the scope of protection of this invention is limited only by the following claims and their equivalents.

We claim:

1. A method for producing a two-dimensional wireframe graphics display of a tessellated three-dimensional object in real time with hidden lines eliminated or displayed in a line style different from that of visible lines in a graphics display system which comprises a depth buffer holding a depth value for any given pixel, a frame buffer which stores a pixel color value for each pixel for display corresponding to each said depth value, and a display screen, each buffer containing a storage location for each pixel on said display screen, said display being produced from surface data representing vertices of a set of polygons defining faces of the three-dimensional object, said surface data being transformed into data representing a two-dimensional projection of the object onto a view plane, said graphics display system allowing for a plurality of object locations at different distances from a chosen view point, wherein a first location for display is set in relation to a chosen view point, said method comprising the steps of:
   (a) masking said frame buffer to prevent any color values from being written thereto;
   (b) scanconverting the faces of the object to obtain a depth value for each pixel covered by a projection of the object;
   (c) during said scanconverting step, performing a depth buffer test wherein the depth buffer is updated with the obtained depth value for a given pixel storage location only when the obtained depth value is smaller than a depth value previously stored at said given pixel storage location in the depth buffer;
   (d) unmasking said frame buffer;
   (e) altering a location at which display will take place from said first location to a second location that is a distance in front of visible faces of the object at said first location in relation to the chosen view point;
   (f) performing said depth buffer test and updating the frame buffer with color values for all tessellation edges of the object at said distance in front of visible faces of the object in relation to said chosen viewpoint; and
   (g) displaying the tessellation edges of the object on the display screen.

2. The method as set forth in claim 1, wherein said graphics display system further includes a viewing matrix mapped with depth translation coordinates, and wherein said distance is subtracted from said depth translation coordinates in the viewing matrix and is determined by an epsilon-based transformation operating on depth values of a farthest and closest vertex of the object in relation to the view point, a number of bits allotted for each pixel in the depth buffer, and a predetermined number for preventing an equal depth value for a face and an adjacent edge, said number compensating for rounding errors during scanconversion.

3. The method as set forth in claim 2, wherein said distance is derived from said epsilon-based transformation as follows:

$$\text{distance} = (Z_{max} - Z_{min})/2^{(n-1)}$$

where $Z_{max}$ is the depth value in integer form of the farthest vertex of the object in relation to the viewpoint, $Z_{min}$ is the depth value in integer form of the closest vertex of the object in relation to the viewpoint, n is the number of bits allotted for each pixel in the depth buffer, and the "$2^{-1}$" value prevents said equal depth value of an interior of said face and said adjacent edge caused by rounding depth values during scanconversion.

4. The method as set forth in claim 1, wherein, said tessellated three-dimensional object comprises a plurality of tessellated three-dimensional objects, wherein each step is performed for all of said plurality of objects prior to performing the next step.

5. The method as set forth in claim 1, wherein said hidden lines are displayed in a line style different from that of visible lines, said method further comprising the following steps performed prior to step (a):
   turning the depth buffer test off;
   choosing a line style desired for hidden lines;
   updating the frame buffer with color values for all tessellation edges of the object;
   displaying all tessellation edges of the object on the display screen in said line style chosen for hidden lines;
   choosing a line style desired for visible lines that is different from that chosen for hidden lines, wherein step (g) comprises displaying in said line style chosen for visible lines; and
   turning the depth buffer test back on.

6. The method as set forth in claim 5, wherein said tessellated three-dimensional object comprises a plurality of tessellated three-dimensional objects, wherein each step is performed for all of said plurality of objects prior to performing the next step.

7. The method as set forth in claim 1, wherein said graphics display system further includes a viewing matrix mapped with depth translation coordinates, and wherein said distance is subtracted from said depth translation coordinates in the viewing matrix and is determined by an epsilon-based transformation operating on depth values of a farthest and closest vertex of the object in relation to the view point and a number of bits allotted for each pixel in the depth buffer.

8. The method as set forth in claim 7, wherein said distance is derived from said epsilon-based transformation as follows:

$$distance = (Z_{max} - Z_{min})/2^n$$

where $Z_{max}$ is the depth value of the farthest vertex of the object in relation to the view point, $Z_{min}$ is the depth value of the closest vertex of the object in relation to the view point and n is the number of bits allotted for each pixel in the depth buffer.

9. A method for producing a two-dimensional wireframe graphics display of a tessellated three-dimensional object in real time showing only visible silhouette and intersection edges in a graphics display system which comprises a depth buffer holding a depth value for any given pixel, a frame buffer which stores a pixel color value for each pixel for display corresponding to each said depth value, and a display screen, each buffer containing a storage location for each pixel on said display screen, said display being produced from surface data representing vertices of a set of polygons defining faces of the three-dimensional object, said surface data being transformed into data representing a two-dimensional projection of the object onto a view plane, said graphics display system allowing for a plurality of object locations at different distances from a chosen view point, wherein a first location for display is set in relation to a chosen view point, said method comprising the steps of:

(a) masking said frame buffer;

(b) scanconverting the faces of the object to obtain a depth value for each pixel covered by a projection of the object;

(c) during the scanconversion of step (b), performing a depth buffer test wherein the depth buffer is updated with the obtained depth value for a given pixel storage location only when the obtained depth value is smaller than a depth value previously stored at said appropriate pixel storage location in the depth buffer;

(d) unmasking said frame buffer;

(e) altering a location at which display will take place from said first location to a second location that is a distance behind visible faces of the object at said first location in relation to the chosen view point;

(f) performing said depth buffer test and updating the frame buffer with color values for all tessellation edges of the object at said distance back from visible faces of the object in relation to the viewpoint;

(g) displaying the tessellation edges of the object on the display screen in a first line thickness;

(h) altering the location at which display will take place from said second location to a third location that is a distance in front of the visible faces of the object at said first location in relation to the view point;

(i) performing said depth buffer test and updating the frame buffer with color values for all intersection edges of the object at said third location; and (j) displaying said visible silhouette and intersection edges in a second line thickness thicker than said first line thickness.

10. The method as set forth in claim 9, wherein said graphics display system further includes a viewing matrix mapped with depth translation coordinates, and wherein said distance is added to said depth translation coordinates in the viewing matrix in step (e) and twice subtracted in step (h), and is determined by an epsilon-based transformation operating on depth values of a farthest and closest vertex of the object in relation to the view point, a number of bits allotted for each pixel in the depth buffer, and a predetermined number for preventing an equal depth value for a face and an adjacent edge, said number compensating for rounding errors during scanconversion.

11. The method as set forth in claim 10, wherein said distance is derived from said epsilon-based transformation as follows:

$$distance = (Z_{max} - Z_{min})/2^{(n-1)}$$

where $Z_{max}$ is the depth value in integer form of the farthest vertex of the object in relation to the viewpoint, $Z_{min}$ is the depth value in integer form of the closest vertex of the object in relation to the viewpoint, and n is the number of bits allotted for each pixel in the depth buffer, and the "$2^{-1}$" value prevents an equal depth value of an interior of said face and said adjacent edge caused by rounding depth values during scanconversion.

12. The method as set forth in claim 9, wherein said tessellated three-dimensional object comprises a plurality of tessellated three-dimensional objects, and wherein each step is performed for all of said plurality of objects prior to performing the next step.

13. The method as set forth in claim 9, wherein said graphics display system further includes a viewing matrix mapped with depth translation coordinates, and wherein said distance is subtracted from said depth translation coordinates in the viewing matrix in step (e) and twice subtracted in step (h), and is determined by an epsilon-based transformation operating on depth values of a farthest and closest vertex of the object in relation to the view point and a number of bits allotted for each pixel in the depth buffer.

14. The method as set forth in claim 13, wherein said distance is derived from said epsilon-based transformation as follows:

$$distance = (Z_{max} - Z_{min})/2^n$$

where $Z_{max}$ is the depth value of the farthest vertex of the object in relation to the view point, $Z_{min}$ is the depth value of the closest vertex of the object in relation to the view point and n is the number of bits allotted for each pixel in the depth buffer.

15. A method for producing a two-dimensional wireframe graphics display of a tessellated three-dimensional object in real time showing visible silhouette and intersection edges in one line style and hidden silhouette and intersection edges in a different line style in a graphics display system which comprises a depth buffer holding a depth value for any given pixel, a frame buffer which stores a pixel color value for each pixel for display corresponding to each said depth value, and a display screen, each buffer containing a storage location for each pixel on said display screen, said display being produced from surface data representing vertices of a set of polygons defining faces of the three-dimensional object, said surface data being transformed into data representing a two-dimensional projection of the object onto a view plane, said graphics display system allowing for a plurality of object locations at different distances from a chosen view point, wherein a first location for display is set in relation to a chosen view point, said method comprising the steps of:
  (a) choosing a line style desired for hidden lines;
  (b) masking said frame buffer;
  (c) scanconverting the faces of the object to obtain a depth value for each pixel covered by a projection of the object;
  (d) during said scanconverting of step (c), performing a depth buffer test wherein the depth buffer is updated with the obtained depth value for a given pixel storage location only when the obtained depth value is smaller than a depth value previously stored at said pixel storage location in the depth buffer;
  (e) unmasking said frame buffer;
  (f) altering a location at which display will take place from said first location to a second location that is a distance behind visible faces of the object at said first location in relation to the chosen view point;
  (g) performing said depth buffer test and updating the frame buffer with color values for all tessellation edges of the object at said second location;
  (h) displaying the tessellation edges of the object in said hidden line style on the display screen in a first line thickness;
  (i) setting all storage locations in the depth buffer to values corresponding to a farthest position possible in relation to the viewpoint;
  (j) altering the location at which display will take place to said first location;
  (k) performing said depth buffer test and updating the frame buffer with color values for all intersection edges of the object;
  (l) displaying the intersection edges of the object in said hidden line style on the display screen in a second line thickness thinner than said first line thickness;
  (m) choosing a line style desired for visible lines that is different from that chosen for hidden lines;
  (n) masking said frame buffer;
  (o) scanconverting the faces of the object to obtain a depth value for each pixel covered by the projection of the object;
  (p) during the scanconversion of step (o), performing said depth buffer test;
  (q) unmasking said frame buffer;
  (r) altering the location for display to said second location;
  (s) performing said depth buffer test and updating the frame buffer with color values for all tessellation edges of the object at said distance back from the visible faces of the object in relation to the viewpoint;
  (t) displaying the tessellation edges of the object in said visible line style on the display screen in said first line thickness;
  (u) altering the location for display to a third location that is a distance in front of the visible faces of the object at said first location in relation to the view point;
  (v) performing said depth buffer test and updating the frame buffer with color values for all intersection edges of the object at said distance in front of the visible faces of the object in relation to the viewpoint; and
  (w) displaying the intersection edges of the object in said visible line style on the display screen in said second line thickness.

16. The method as set forth in claim 15, wherein said graphics display system further includes a viewing matrix mapped with depth translation coordinates, and wherein said distance is added to said depth translation coordinates in the viewing matrix in step (f), then subtracted in step (j), again added in step (r), and twice subtracted from the depth translation coordinates in step (u), and is determined by an epsilon-based transformation operating on depth values of a farthest and closest vertex of the object in relation to the view point, a number of bits allotted for each pixel in the depth buffer, and a predetermined number for preventing an equal depth value for a face and an adjacent edge, said number compensating for rounding errors during scanconversion.

17. The method as set forth in claim 16, wherein said distance is derived from said epsilon-based transformation as follows:

$$\text{distance} = (Z_{max} - Z_{min})/2^{(n-1)}$$

where $Z_{max}$ is the depth value in integer form of the farthest vertex of the object in relation to the viewpoint, $Z_{min}$ is the depth value in integer form of the closest vertex of the object in relation to the viewpoint, n is the number of bits allotted for each pixel in the depth buffer, and the "$2-1$" value prevents said equal depth value of an interior of said face and said adjacent edge caused by rounding depth values during scanconversion.

18. The method as set forth in claim 15, wherein said tessellated three-dimensional object comprises a plurality of tessellated three-dimensional objects, wherein steps (b) through (j) are practiced in turn for each of said plurality of objects alone, and wherein steps (a) and (k) through (w) are each performed for all of said plurality of objects prior to performing the next step.

19. The method as set forth in claim 15, wherein said graphics display system further includes a viewing matrix mapped with depth translation coordinates, and wherein said distance is added to said depth translation coordinates in the viewing matrix in step (f), subtracted in step (j), again added in step (r) and twice subtracted in step (u), and is determined by an epsilon-based transformation operating on depth values of a farthest and closest vertex of the object in relation to the view point and a number of bits allotted for each pixel in the depth buffer.

20. The method as set forth in claim 19, wherein said distance is derived from said epsilon-based transformation as follows:

$$\text{distance} = (Z_{max} - Z_{min})/2^n$$

where $Z_{max}$ is the depth value of the farthest vertex of the object in relation to the view point, $Z_{max}$ is the depth value of the closest vertex of the object in relation to the view point and n is the number of bits allotted for each pixel in the depth buffer.

21. A method for distinguishing between visible and hidden lines in a two-dimensional wire-frame graphics display of a tessellated three-dimensional object in a graphics display system comprising a display screen, and a depth buffer containing a storage location for each pixel on said display screen, said display being produced from surface data representing vertices of a set of polygons defining faces of the three-dimensional object, said surface data being transformed into data representing a two-dimensional projection of the object onto a view plane, said graphics display system allowing for a plurality of object locations at different distances from a chosen view point, wherein a first location for display is set in relation to a particular view point, said method comprising the steps of:

- obtaining a depth value for each pixel covered by a projection of the object;
- replacing a depth value previously stored in a given pixel location in the depth buffer with the depth value obtained in said step of obtaining if the depth value obtained is less than the depth value previously stored;
- altering a position at which display will take place from said first location to a second location which is closer to the viewpoint by subtracting a distance from depth translation coordinates in a viewing matrix within said graphics display system, wherein said distance is determined by an epsilon-based transformation operating on depth values of a farthest and closest vertex of the object in relation to the view point and a number of bits allotted for each pixel in the depth buffer; and
- displaying tessellation lines of the object at the altered position.

22. A method for distinguishing silhouette edges from other tessellation edges that are not silhouette edges in a two-dimensional wire-frame graphics display of a tessellated three-dimensional object in a graphics display system comprising a display screen, and a depth buffer containing a storage location for each pixel on said display screen, said display being produced from surface data representing vertices of a set of polygons defining faces of the three-dimensional object, said surface data being transformed into data representing a two-dimensional projection of the object onto a view plane, said graphics display system allowing for a plurality of object locations at different distances from a chosen viewpoint, wherein a first location for display is set in relation to a particular view point, said method comprising the steps of:

- obtaining a depth value for each pixel covered by a projection of the object;
- replacing a depth value previously stored in a given pixel location in the depth buffer with the depth value obtained in said step of obtaining if the depth value obtained is less than the depth value previously stored;
- altering a line thickness that the system will use for display to obtain a thicker line than that normally used in the display system;
- altering a position at which display will take place from said first location to a second location which is farther than the first location from the viewpoint; and
- performing said step of replacing again and displaying all pixels relating to the object with a replaced depth value.

* * * * *